United States Patent

[11] 3,624,244

| [72] | Inventors | Piero Luigi Nannelli<br>King of Prussia;<br>Hyman David Gillman, Norristown, both of Pa. |
|---|---|---|
| [21] | Appl. No. | 18,751 |
| [22] | Filed | Mar. 11, 1970 |
| [45] | Patented | Nov. 30, 1971 |
| [73] | Assignee | Pennwalt Corporation<br>Philadeplphia, Pa. |

[54] METHOD OF PREPARING INORGANIC POLYMERS
6 Claims, No Drawings

[52] U.S. Cl. .................................................. 260/2 M, 260/2 P
[51] Int. Cl. .................................................. C08g 33/16, C08g 33/20
[50] Field of Search .................................... 260/2 P, 2 M

[56] References Cited
UNITED STATES PATENTS

| 3,275,574 | 9/1966 | Saraceno .................... | 260/2 P |
| 3,384,604 | 5/1968 | King ........................... | 260/2 P |
| 3,432,532 | 3/1969 | King ........................... | 260/2 P |
| 3,444,103 | 5/1969 | Maguire ..................... | 260/2 P |

*Primary Examiner*—Samuel H. Blech
*Attorneys*—Stanley Litz and Carl A. Hechmer, Jr.

ABSTRACT: Chromium (III) hydroxyaquo bis(phosphinate) and bis(arsinate) polymers of the recurring unit of the formula $[Cr(H_2O)(OH)(OMR_1R_2O)_2]$ where $R_1$ and $R_2$ are inert organic groups and M is phosphorus or arsenic, are prepared by reacting a water-soluble chromium (III) salt with substituted potassium or sodium phosphinate or arsinate in aqueous medium, in the presence of an alkaline neutralizing agent. The polymers are used as coatings which will be subjected to high temperature environment.

METHOD OF PREPARING INORGANIC POLYMERS

This invention relates to an improved method of preparing certain inorganic polymers and more particularly relates to the preparation of chromium(III) phosphinate or arsinate polymers by the reaction of a water-soluble chromium(III) salt with a substituted alkali metal phosphinate or arsinate in aqueous media.

U.S. Pat. No. 3,275,574, issued Sept. 27, 1966, Anthony J. Saraceno, describes and claims certain coordination polymers which are completely inorganic in their backbone, have unexpectedly high temperature stability, and are useful for fabricated articles and as coating compositions to be employed under high temperature conditions. Among the polymers described in that patent are hydroxyaquo metal phosphinate and arsinate polymers. The method disclosed in the patent for preparing these polymers involves a quite cumbersome two step procedure whereby a divalent metal phosphinate or arsinate is first prepared, and this material is oxidized in the presence of a neutral and a univalent ligand in order to yield the product polymer. The oxidation step results in a heterogeneous system and the product obtained is somewhat difficult to purify. U.S. Pat. No. 3,444,103, May 13, 1969, Keith Dean Maguire, describes an improvement over the foregoing original method whereby a more desirable product is obtained by carrying out the oxidation step in a manner that results in the polymer product being in homogeneous solution, wherein the reactants are dispersed in a solution consisting essentially of water and a neutral water miscible organic solvent, the proportion of water and organic liquid being adjusted to maintain the polymer product in solution, and after said oxidation is completed, diluting the solution with water to precipitate the polymer and thereafter separating said polymer from the liquid phase.

The method of the present invention provides an improved, simpler, more economical technique for producing inorganic polymers described in the foregoing patents, having molecular weights ranging from about 2000 to about 100,000. In accordance with this invention a method is provided for preparing chromium(III) hydroxyaquo bis(phosphinate) and bis(arsinate) polymers of the recurring unit having the general formula $[Cr(H_2O)(OH)(OMR_1R_2O)_2]$, where $R_1$ and $R_2$ are inert organic groups, which may be the same or different, such as alkyl, aryl, alkoxy or aryloxy, preferably a hydrocarbon alkyl or aryl group containing from one to 10 carbon atoms, and M is phosphorus or arsenic, wherein a water-soluble chromium(III) salt is reacted with a substituted potassium or sodium phosphinate, or arsinate of the formula $ZOMR_1R_2O$ where Z is sodium or potassium, in the presence of an alkaline neutralizing agent, in solution in aqueous medium or in medium comprising a mixture of water and tetrahydrofuran. A water-tetrahydrofuran system is preferred in preparing the chromium phosphinate polymers and it has been found that the preferred proportion of solvents for this system is about 50 percent tetrahydrofuran and about 50 percent water by volume.

Representative of the many water-soluble chromium(III) salt reactants for use in the process are $CrCl_3 \cdot 6H_2O$, $Cr(NO_3)_3 \cdot 6H_2O$, $CrBr_3 \cdot 6H_2O$, $Cr(C_2H_3O_2)_3 \cdot H_2O$, $CrI_3 \cdot 9H_2O$, $Cr(NO_3)_3 \cdot 9H_2O$, $Cr(NO_3)_3 \cdot 7.5H_2O$, $Cr_2(SO_4)_3 \cdot 7H_2O$, $Cr_2(SO_4)_3 \cdot 15H_2O$, $Cr_2(SO_4)_3 \cdot 18H_2O$ and other hydrated forms of said salts and like materials.

In carrying out the process, the chromium salt is first dissolved in the reaction medium, approximately 100 parts by weight of solvent per five parts by weight of the metal salt. Then, per each equivalent of the metal salt are added, preferably in aqueous solution, two equivalents of the substituted alkali metal phosphinate, or arsinate, and preferably the sodium or potassium phosphinate or arsinate, together with one equivalent of alkaline neutralizing agent, representative of which are the alkali metal (preferably sodium and potassium) carbonates and hydroxides and the like.

The polymerization reaction may be graphically illustrated by the following equation showing the production of a repeat unit by the reaction of chromium(III) chloride and a substituted potassium phosphinate or arsinate in the presence of potassium carbonate as the alkaline neutralizing agent: $CrCl_3 \cdot 6H_2O + KOMR_1R_2O + 0.5K_2CO_3 \longrightarrow [Cr(H_2O)(OH)(OMR_1R_2O)_2] + 3KCl + 0.5CO_2 + 4.5H_2O$, where M is phosphorous or arsenic, and $R_1$ and $R_2$ are inert organic groups.

The polymerization reaction is carried out at temperatures within the range of about 50° C. to about 100° C., with from about 30 to 90 minutes of reaction time being adequate to obtain polymer yields on the order of 95 percent or more. Removal of about 60 percent of the solvent medium by distillation causes the polymer product to precipitate in such yield. The product is recovered by filtration, water-washed, and air-dried at ambient temperature.

The following representative examples illustrate the improved method of this invention for preparing the described, known inorganic polymers.

EXAMPLE 1

Chromium trichloride hexahydrate (0.01 mole, 2.66 g.) is dissolved in 50 ml. of tetrahydrofuran. A solution of sodium diphenylphosphinate (0.02 mole, 4.80 g.) and potassium carbonate (0.005 mole, 0.69 g.) in 50 ml. of water is added with stirring. The reaction mixture is brought to boiling and the tetrahydrofuran allowed to evaporate. The oily product, which slowly separates, becomes progressively harder on evaporation of the tetrahydrofuran solvent. After most of the tetrahydrofuran is removed, fresh water (50 ml.) is added, and the suspension is kept boiling until the precipitate can be easily ground with a spatula. The solid is collected on a filter and washed with water. After the product is dried in the air to constant weight, there is obtained 5.2 g. or 99.8 percent yield of polymer of the recurring unit $[Cr(H_2O)(OH)(OP(C_6H_5)_2O)_2]$. The polymer product shows chemical and physical properties identical to those of the polymer prepared by oxidation of chromium(II) bis(diphenylphosphinate). Fresh chloroform solutions of the product have intrinsic viscosities of about 0.04 dl./g. which increase to about 0.4 dl./g. on standing at 55° C. for a few days. Elemental analysis for the polymer is as follows:

Calculated for $C_{24}H_{23}CrO_6P_2$: C, 55.28; H, 4.45; Cr, 9.97; P, 11.88.

Found: C, 55.01; H, 4.53; Cr, 9.74; P, 11.67.

EXAMPLE 2

Following the procedural steps of the preceding example, 2.66 g. (0.01 mole) of chromium trichloride hexahydrate in 50 ml. of tetrahydrofuran is treated with a solution of 3.12 g. (0.02 mole) of methylphenylphosphinic acid and 2.07 g. (0.015 mole) of potassium carbonate in 50 ml. of water. After most of the tetrahydrofuran is removed by boiling, the phosphinate polymer precipitates as an oily product which becomes a solid upon complete evaporation of the tetrahydrofuran from the boiling water suspension. Washing with water and drying in the air gives 3.9 g. or a 98.2 percent yield of polymer composed of the recurring unit:

$[CR(H_2O)(OH)(OP(CH_3)(C_6H_5)O)_2]$.

The chemical and physical properties of the compound are identical to those of the polymer made by oxidation of the corresponding chromium(II) bis(phosphinate). The intrinsic viscosity of fresh solutions in chloroform is 0.37 dl./g.

Analysis:

Calculated for $C_{14}H_{19}CrO_6P_2$: C, 42.33; H, 4.82; Cr, 13.09; P, 15.59.

Found: C, 42.38; H, 4.81; Cr, 12.90; P, 15.36.

EXAMPLE 3

A procedure in accordance with the previous examples gives 6.3 g. or 95 percent yield of polymer of the recurring unit structure

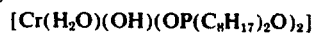
$[Cr(H_2O)(OH)(OP(C_8H_{17})_2O)_2]$ starting from 4.05 g. (0.01 mole) of $Cr(NO_3)_3 \cdot 9H_2O$, 5.80 g. (0.02 mole) of $(C_8H_{17})_2P(O)OH$ and 1.59 g. (0.015 mole) of sodium carbonate. The intrinsic viscosity of the product in chloroform is 0.3 dl./g.

Analysis:

Calculated for $C_{32}H_{71}CrO_6P_2$: C, 57.73; H, 10.71; Cr, 7.81; P, 9.30.

Found: C, 57.78; H, 10.57; Cr, 7.94; P, 9.52.

EXAMPLE 4

The copolymer of composition of recurring unit $[Cr(H_2O)(OH)(OP(C_6H_5)_2O)(OP(C_8H_{17})_2O)]$ is prepared by treating a solution of 2.66 g. (0.01 mole) of $CrCl_3 \cdot 6H_2O$ in 50 ml. of tetrahydrofuran with a 50 ml. water solution containing 3.12 g. (0.01 mole) of $NaOP(C_8H_{17})_2O$, 2.40 g. (0.01 mole) of $NaOP(C_6H_5)_2O$, and 0.691 g. (0.005 mole) of potassium carbonate. Boiling for about half an hour followed by removal of the tetrahydrofuran precipitates the copolymer which is then washed with water and air-dried. The product weights 5.7 g., corresponding to a 96.1 percent yield. The intrinsic viscosity of a chloroform solution is 0.1 dl./g. The infrared spectrum is consistent with the above structure.

EXAMPLE 5

To a solution of 1.33 g. (0.005 mole) of chromium trichloride hexahydrate in 50 ml. of water, a solution of 2.62 g. (0.01 mole) of diphenylarsinic acid and 1.03 g. (0.0075 mole) of potassium carbonate in 50 ml. of water is added with stirring. After boiling for about half an hour, the resulting green suspension is filtered and the precipitate washed with water. Drying in the air to constant weight gives 2.7 g. (a 95.2 percent yield) of polymer having the recurring unit:

$$[Cr(H_2O)(OH)(OAs(C_6H_5)_2]$$

The intrinsic viscosity of the polymer in chloroform is 0.025 dl./g. The infrared spectrum is consistent with the above structure.

Analysis:

Calculated for $C_{24}H_{23}CrO_6As_2$: C, 47.31; H, 3.80.
Found: 46.44; H, 4.17.

EXAMPLE 6

Diphenylarsinic acid (1.31 g., 0.005 mole), diphenylphosphinic acid (1.09 g., 0.005 mole), and potassium carbonate (1.03 g., 0.0075 mole) are dissolved in 50 ml. of water. The solution is then added with stirring to a solution of chromium trichloride hexahydrate (1.33 g., 0.005 mole) in 50 ml. of water. After the mixture is boiled for about half an hour, the precipitate is filtered, washed with water, and dried in the air. The yield of polymer of the repeating unit:

$$[Cr(H_2O)(OH)(OP(C_6H_5)_2O)(OSs(C_6H_5)_2O)]$$

is 2.6 g. (95.6 percent). The polymer's intrinsic viscosity in chloroform is 0.065 dl./g.

Analysis:

Calculated for $C_{24}H_{23}CrO_6AsP$: C, 50.99; H, 4.10.
Found: C, 50.43; H, 4.39.

We claim:

1. A method of preparing an inorganic polymer composed of the repeating unit $[Cr(H_2O)(OH)(OMR_1R_2O)_2]$ which comprises reacting a water-soluble chromium (III) salt with a substituted phosphinate or arsinate of the formula $ZOMR_1R_2O$, in aqueous medium, in the presence of an alkaline neutralizing agent, where M is phosphorus or arsenic, Z is sodium or potassium, and $R_1$ and $R_2$ are alkyl, aryl, alkoxy or aryloxy.

2. The method according to claim 1 wherein the aqueous reaction medium comprises a mixture of water and tetrahydrofuran.

3. The method according to claim 1 wherein the alkaline neutralizing agent is alkali metal carbonate or hydroxide.

4. The method according to claim 1 wherein $R_1$ and $R_2$ are each phenyl.

5. The method according to claim 1 wherein $R_1$ is methyl and $R_2$ is phenyl.

6. The method according to claim 1 wherein $R_1$ and $R_2$ are each octyl.

* * * * *